Figure 1:
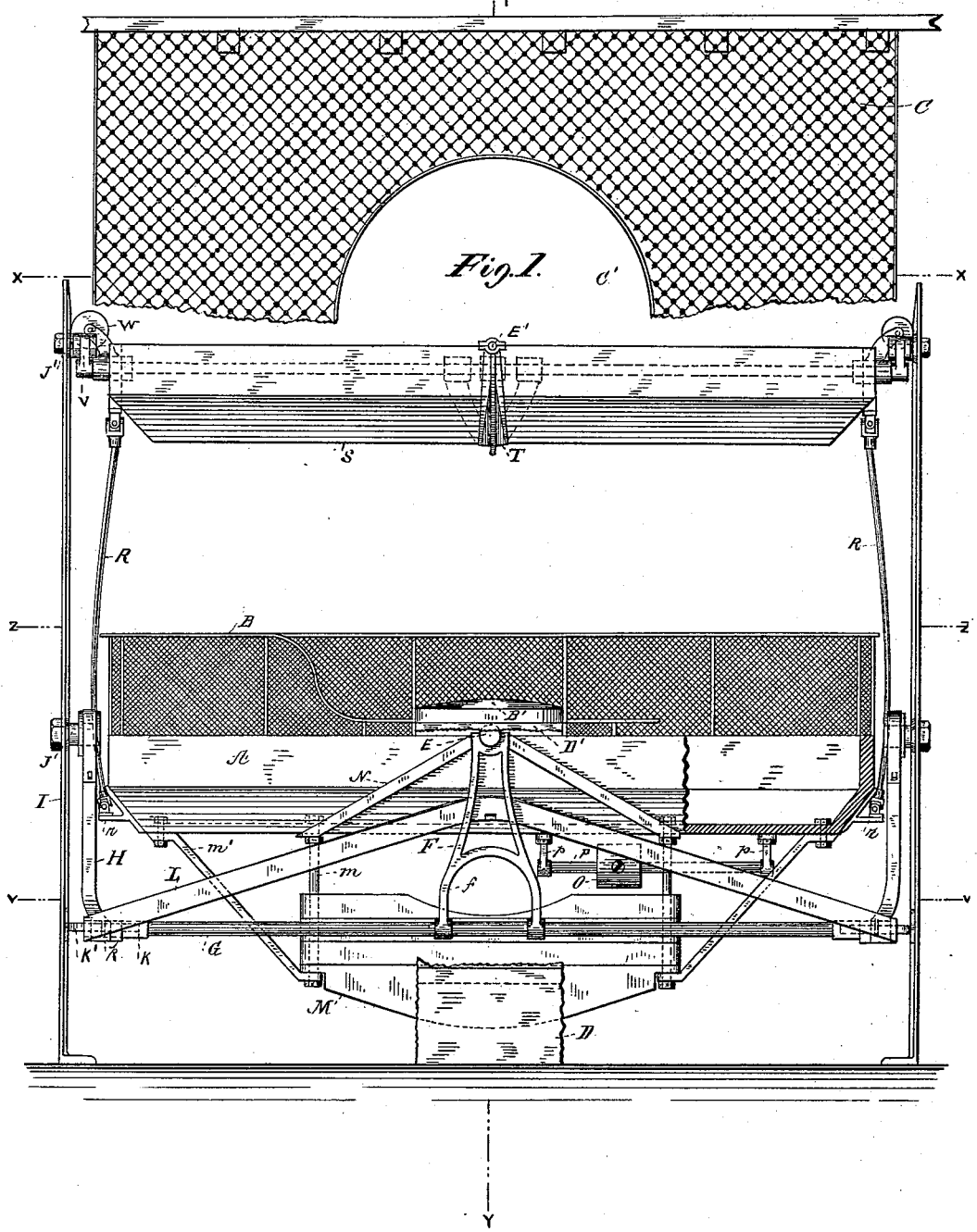

(No Model.) 5 Sheets—Sheet 1.

J. B. SECOR.
AUTOMATIC SHIP'S BERTH.

No. 343,072. Patented June 1, 1886.

WITNESSES:

INVENTOR
Jerome B. Secor
BY Knight Bros
ATTORNEYS (No Model.)  5 Sheets—Sheet 2.

J. B. SECOR.
AUTOMATIC SHIP'S BERTH.

No. 343,072.  Patented June 1, 1886.

WITNESSES:

INVENTOR
Jerome B. Secor
BY Knight Bros.
ATTORNEYS (No Model.) 5 Sheets—Sheet 3.
J. B. SECOR.
AUTOMATIC SHIP'S BERTH.
No. 343,072. Patented June 1, 1886.
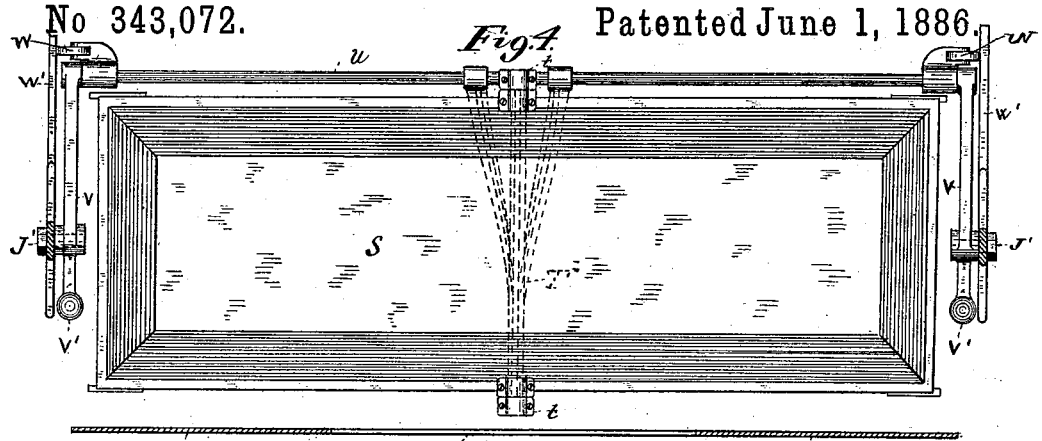
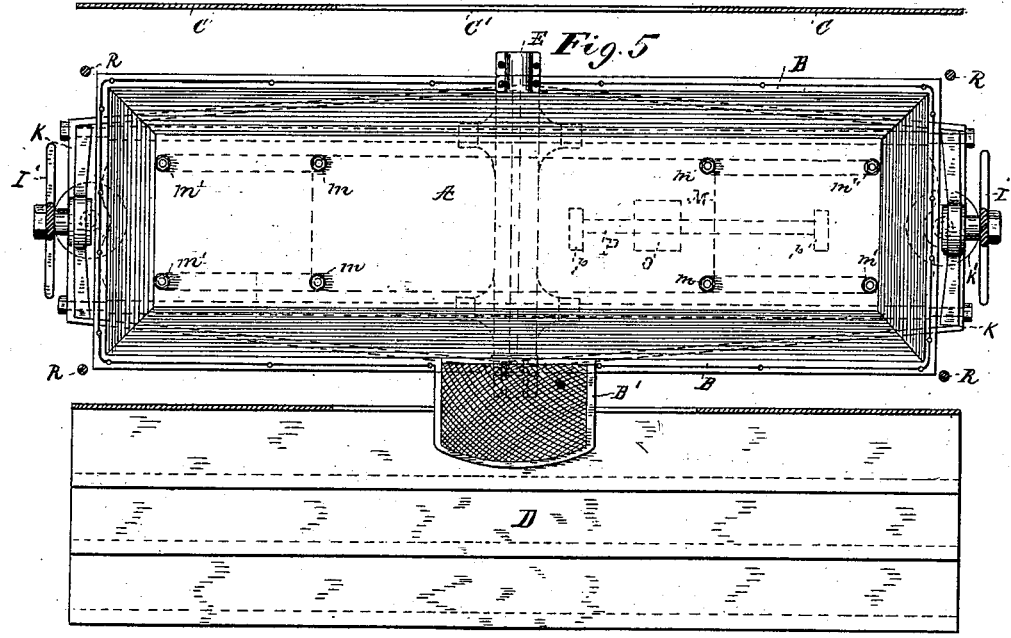
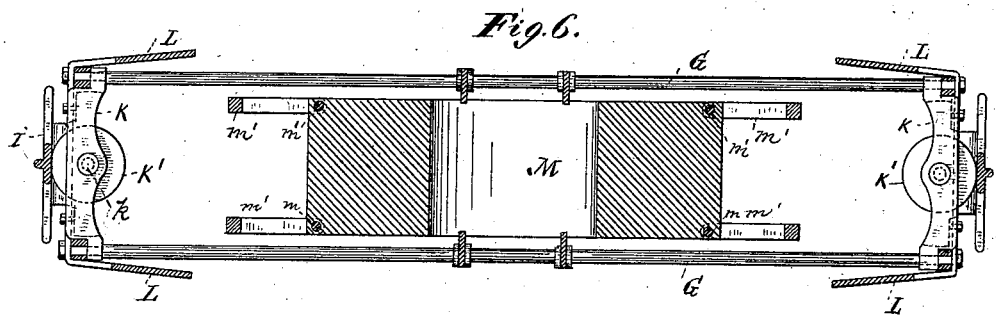
WITNESSES: INVENTOR
Gabriel J. W. Galster Jerome B. Secor
Edward Steer BY Knight Bros.
ATTORNEY
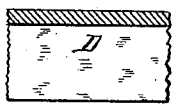
N. PETERS, Photo-Lithographer, Washington, D. C.

(No Model.) 5 Sheets—Sheet 4.

J. B. SECOR.
AUTOMATIC SHIP'S BERTH.

No. 343,072. Patented June 1, 1886.

WITNESSES

INVENTOR
Jerome B. Secor
By Knight Bros.
Attorneys (No Model.) 5 Sheets—Sheet 5.

J. B. SECOR.
AUTOMATIC SHIP'S BERTH.

No. 343,072. Patented June 1, 1886.

WITNESSES

INVENTOR

UNITED STATES PATENT OFFICE.

JEROME B. SECOR, OF BRIDGEPORT, CONNECTICUT, ASSIGNOR TO PHILLIP VAN VOLKENBURGH, JR., EDWARD S. RAPALLO, AND DAVID J. NEWLAND, ALL OF NEW YORK, N. Y.

AUTOMATIC SHIP'S BERTH.

SPECIFICATION forming part of Letters Patent No. 343,072, dated June 1, 1886.

Application filed June 18, 1885. Serial No. 169,073. (No model.)

*To all whom it may concern:*

Be it known that I, JEROME B. SECOR, a citizen of the United States, residing at Bridgeport, in the county of Fairfield and State of Connecticut, have invented certain new and useful Improvements in Self-Leveling or Automatic Ship-Berths, of which the following is a specification.

My invention relates, broadly, to a system of self-leveling or automatically-operating berths intended for the use of sea-going vessels, the said berths being so constructed and arranged as that they will maintain a constant level by the operation of gravity, as will be described. The objects of such an arrangement are apparent—to wit, to dispense with the disagreeable rocking and shifting which the occupant is liable to be subjected to when the vessel is pitching and rolling, and to provide a perfectly comfortable bed for the passenger, as the berth always remains at a level position, no matter what and how great the movement of the vessel may be. Other devices have been shown, described, and claimed in previous Letters Patent of the United States; but in every instance, so far as I know, they have embodied devices which have proved abortive, unfinished, and imperfect.

The nature of my invention is therefore to make certain improvements in the art both as to principle and more especially as to detail, and to perfect a system of self-leveling or automatic ship-berths, as aforesaid.

To these ends my invention consists in providing centrally-located pivots for the berths at their sides, said pivots seating and turning in bearings arranged within suitable frames which surround said berths, and which are pivoted in turn to the bulk-head of the state-room. A weight is attached to and suspended under the swinging berths, the said weight operating, as before stated, to retain the berth in a constant position relatively to the surface of the sea at rest. Connected to the four corners of the lower berth are upwardly-extending arms, which are attached to the upper berth, constructed substantially on the same principle as the lower. The fastening devices between the arms and the berths consist of knuckle or ball-and-socket joints. By this arrangement the upper berth will move in unison with the lower, and both will be controlled by the swinging weight. The upper berth, like the lower, is hung at the sides by suitable trunnions, which seat in bearings at the ends of an arm which extends under and partially encircles the berth. One end of this arm is keyed or otherwise rigidly attached to a shaft extending laterally with the berth and directly to the rear of it. The ends of this shaft are secured to transverse arms extending forward to a point midway of the berth, where they are hung in the bulk-head similarly to the lower frame.

Other details of my invention will be hereinafter particularly referred to, and pointed out in the claims.

Figure 2:
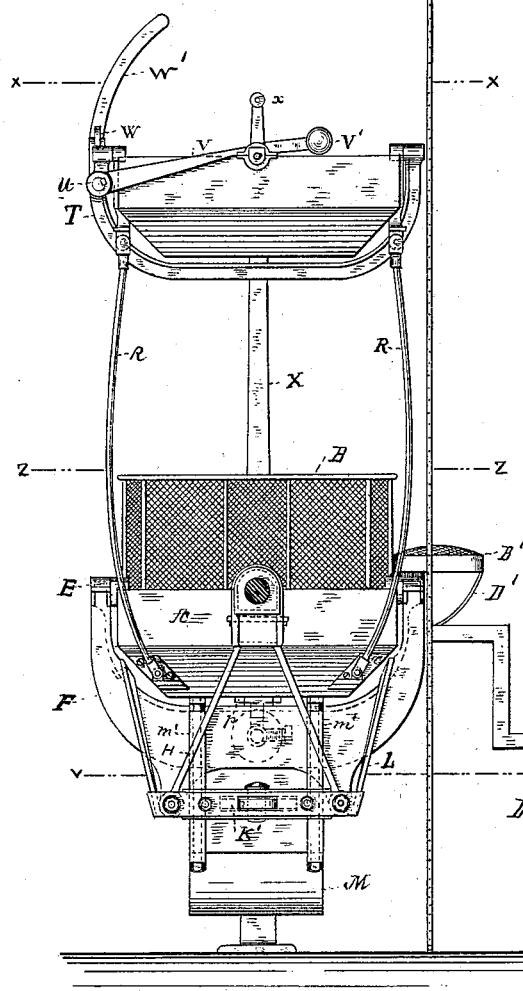
Figure 3:
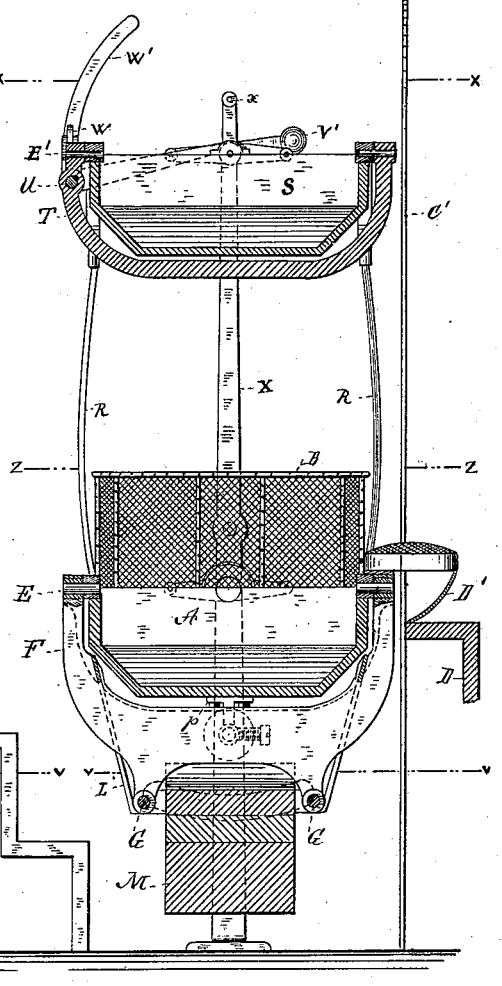
Figure 7:
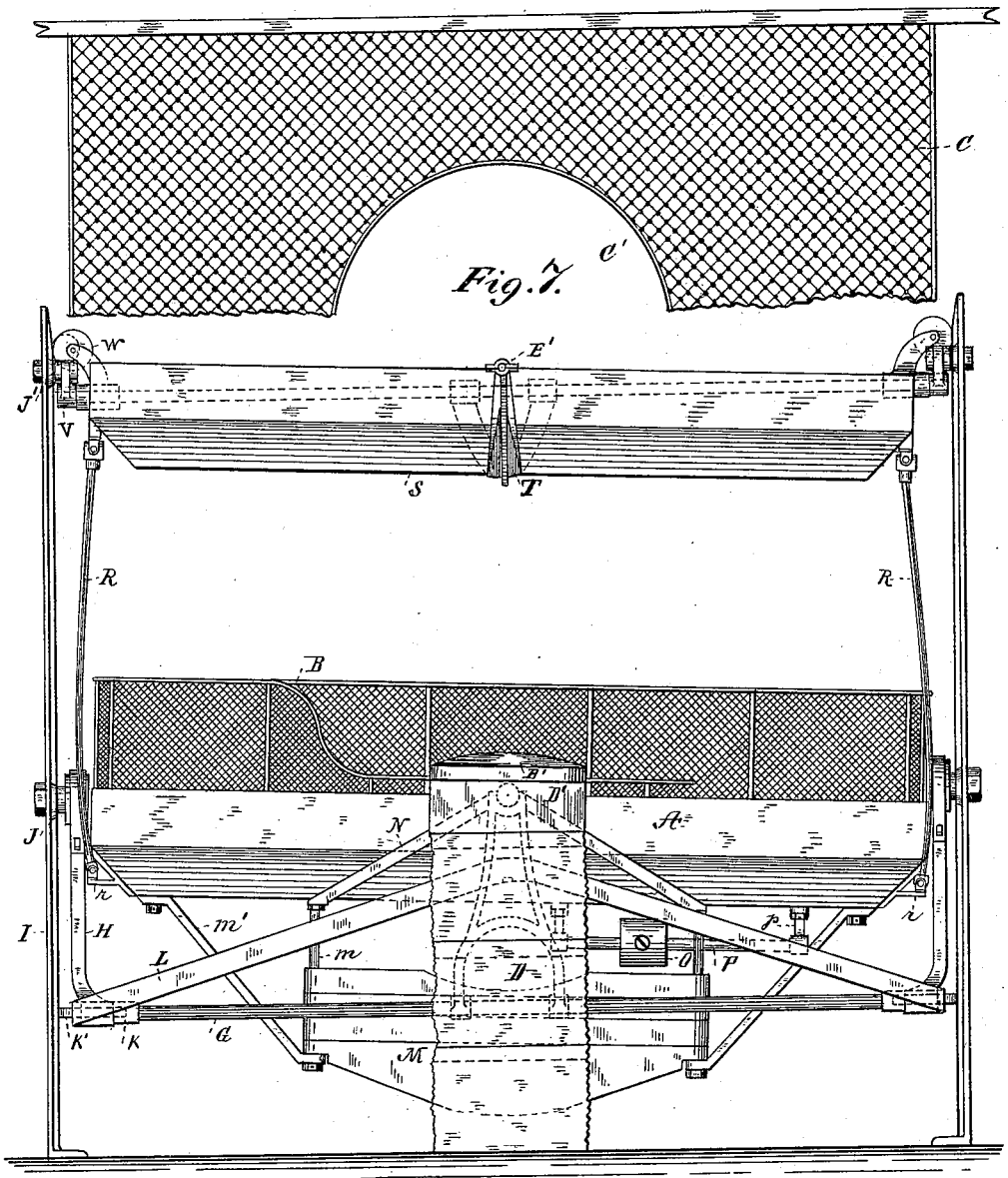
Figure 8:
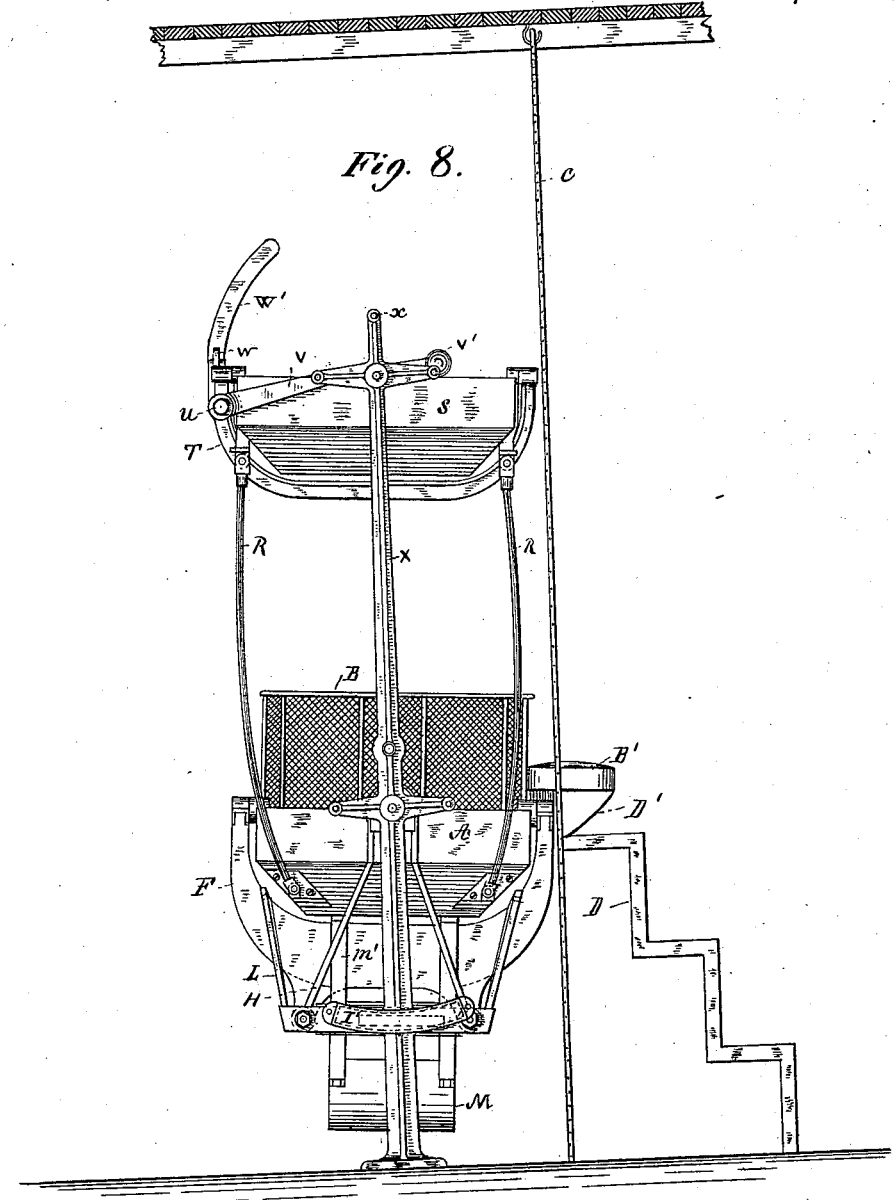

Referring to the accompanying drawings, which form a part of this specification, Figure 1 represents a side elevation showing a portion of the lower berth and the greater part of the outside guard cut away. Fig. 2 is a sectional view on the line 2 2, Fig. 1, and represents the upper and lower berths and most of their accoutrements in elevation. Fig. 3 is a similar sectional view on the line Y Y, Fig. 1. Fig. 4 is a plan view on the line X X in Figs. 1, 2, and 3, and represents a detailed view of the upper berth and the means and mechanism for suspending it. Fig. 5 is a similar view on the line Z Z, Figs. 1, 2, and 3 of the lower berth. Fig. 6 is a plan sectional view on the line V V, Figs. 1, 2, and 3, showing the gravity-weight and the rolling mechanism operating on the bulk-head of the state-room. Fig. 7 is a side elevation of the frame-work slightly deviated from the vertical, showing the berth, both upper and lower, as resting on lines at right angles with the vertical. This is to illustrate the pitch or pitch-motion. Fig. 8 is an end elevation showing the frame-work somewhat deviating from the vertical; also, the berth resting on lines at right angles with the vertical. This is to illustrate the rolling motion.

In these drawings, A is a berth box or bunk, constructed preferably as shown in the figures, and provided on all its sides with a wire or wicker frame, B, which frame may be cut away at the front side, (see Fig. 1,) for the more easy ingress and egress of the occupant or passenger. Parts of this frame may also be made removable—as, for instance, the aforesaid front, or either or both ends—to enable an easy access for the person making up the bed within the berth. The object of this wicker frame is to serve as a guard when the berth is occupied, and to prevent the occupant from rolling from the berth, and also to preclude the danger which would arise from the passenger protruding his arms, head, &c., over the edge of the berth which he is occupying. At the part B' on this wicker frame I may construct a seat or small platform, which may be used in getting in and out of the berth. Other modifications as to detail may be made upon this part of the structure, as may appear advisable from time to time without departing from the spirit of my invention in this respect. An exterior guard, C, of wire-gauze or other suitable material, is also arranged, as partly shown in elevation, Figs. 1 and 7, and in section in the other figures. This guard is broken away below (in Figs. 1 and 7) to show the berth and other appurtenances beyond. The said guard may be attached to the floor and ceiling of the state-room; or in place of being attached to the floor at its lower portion it may be secured to a step or steps, D, arranged along the side of the apparatus next the floor. These steps, as shown in the end elevation in Fig. 2, constitute a safety-guard against the weight suspended from the berths, the said weight being adapted to swing from side to side when the ship is rolling. The space C' is left open, as shown in Fig. 1. The parts C may be made removable in the same manner and for the same purpose as the guards B.

Contiguous to and connected with the seat B', at the inner edges of the guard C, is the supplementary guard D' made preferably of leather to complete the protection afforded by the parts just described.

At the sides of the berth A, and midway between the ends, are placed trunnions E, which serve as the axes of motion. These trunnions seat and turn in suitable frames, F. By this arrangement the berth A is provided with an independent movement operative under the influence of gravity, whereby it is adapted to remain at a constant level during the pitching motion of the ship. The frame F is yoke-shaped and is divided at each of its lower ends into two branches, f. Through openings in the ends of these branches run longitudinal bars G, which connect at their outer ends with V-shaped suspenders H. By means of these latter the frame, the berths or bunks, and the depending governing-weight are all hung to the bulk-head I at points J.

Between the ends of the bar G and the V-shaped suspenders H are hollow castings K, which serve to connect these parts and to give them more strength and rigidity. Anti-friction rollers K' are set into the hollow portion of the casting K, and turn on axis k and bear against tracks I' upon the bulk-heads I. These tracks are arc shape, and are arranged in such a manner as that when the frames are moving relatively to the bulk-heads the rollers K' will travel on the aforesaid track I', preventing thereby any sudden thrust against the bulk-heads. Braces L are also attached to the castings K and extend upwardly to the side of the frame F, to which they are attached, and downwardly to the casting K at the other end of the berth.

From the bottom of the berth A is hung a governing-weight, M, by means of rods m and m'. The berth is also provided with braces or stays N, which extend from beneath the pivots or trunnions to the upper ends of the rods m.

O is a weight adjustable on the bar P, suspended by means of rods b to the bottom of the berth-boxes. The use of this device will be explained hereinafter.

Four rods are connected to the four corners of the berth by means of knuckle or ball-and-socket joints r, and extend upwardly and are connected by a similar means and in like places to the upper berth, S. This berth is shown in side elevation in Fig. 1, in elevation in Fig. 2, and in plan in Fig. 4. It is provided with pivots or trunnions E', similar in their construction and operation to the trunnions E on the lower berth, and with an arm, T, which extends beneath the berth and from one side to another, and is provided with suitable bearings or journal-boxes, t, in which the trunnions or pivots E' are adapted to seat and turn. It is subdivided as it approaches the rear portion of the berth, as shown in Figs. 1 and 4, so as to give it greater strength and rigidity, and is attached to shaft U, placed in the rear of and parallel to the berth. The ends of this shaft are secured by suitable means to transverse arms V, situated parallel to the ends of the berth. These transverse arms are hung from the bulk-heads at points J', midway of the berth-box S. The transverse arms V may be extended beyond the pivoted points J, as shown in Figs. 2, 3, and 4, and provided at their ends with weights V', for the purpose of counterbalancing the weight of the shaft U and the inner ends of the transverse arm V. Friction-rollers W are also attached to the shaft U, and are adapted to travel up and down on the tracks W', arranged upon the bulk-heads. The object of these rollers and the tracks is the same as already described in connection with the rollers K' and tracks I'—namely, to resist the outward thrust of the berths and frames and facilitate the movement of the working parts.

The bulk-heads are provided with vertical iron shafts or angle-iron pillars X, which may be set against or into the bulk-heads in which are hung the trunnions J and J'. They are provided with openings x, through which screws may be inserted for attaching them to the wood-work of the bulk-head. The operation of this arrangement is as follows: When the berth A is occupied and the vessel in which it is located is pitching—that is, rising bow on—the berth will turn upon the trunnions E, or, rather, the ship will move away from the berth, which, by virtue of its being pivoted on trunnions E, will be permitted to remain at rest, the weight M acting as a governor and serving to control it and retain it in a level position. The connections between the upper and lower berth are such that the said upper berth will follow and respond to every action of the lower, the upper berth turning on the trunnions or axis of motion E'. During this motion of the ship the bulk-heads and the frame, together with the guards C, move relatively to the berth, the latter, as before stated, remaining in a level position. This is illustrated in Fig. 7, where the berths are shown in a position at right angles to the vertical, (represented by a dotted line,) and the bulkheads and the frame as somewhat deviating from the vertical. This is the position taken by the parts during the pitching motion of the ship or vessel, as the berth always remains level, and to the occupant of the berth there will be no perceptible motion. The same principle is taken advantage of during the rolling motion of the ship. When this motion takes place, the frame hereinbefore described, and shown in the drawings, as pivoted to the bulk-heads at points J and J', will move as one with the berth-boxes. The ship then, when rolling, will not only move away from the berths, but also from their containing and supporting frames. The rolling motion is illustrated in Fig. 8. The entire mechanism, in other words, being hung on the points J and J', will be controlled by the gravity-weight M, and will retain a level position by virtue of said weight and by virtue of the construction of the frame when the ship or vessel rolls from side to side. It has been found by experiment that the above described device operates perfectly under these different conditions, and that no susceptible motion is apparent to the occupant of either the upper or lower berth, and that, also, the device is equally well adapted to operate when the ship or vessel gives a lurch or movement that is neither a roll nor, at the same time, a pitch, but the combination of the two. The small weight O, which is suspended under the berth, can be moved along the bar P, and serves as an adjusting device when the berth is occupied. This device may also be attached to the upper berth, as shown in Fig. 1. It will be seen that the pitching motion of the ship will cause an apparent longitudinal vibration of the berths, and that the rolling motion will cause an apparent transverse vibration of the berths and frames. These motions or vibrations are merely relative, however, as the ship, as a matter of fact, moves away from the berth, while the latter remains at rest and at a constantly level position. It will also be understood, that although I have shown and described my invention as particularly applicable to two berths arranged one above the other, I do not limit myself to two, but contemplate, when convenient and desirable, to arrange them in series of three, one above the other.

Having thus described my invention, what I claim as new therein, and desire to secure by Letters Patent, is—

1. The combination, with the bulk-heads of the state-room, of two or more berths each attached to and suspended from said bulk-heads independently of the other, a weight suspended from and beneath the lower berth, and universal connections between the respective corners of the berths, as set forth.

2. The combination of the upper and lower berths, trunnions projecting from the opposite sides of each at about its mid-length, frames in which said trunnions are journaled extending to the opposite ends of the berths and having trunnions projecting therefrom in a direction longitudinal to said berths, the bulk-heads in which said trunnions are journaled, universal connections between the respective corners of said berths, and a weight suspended directly beneath the lower berth, as and for the purposes set forth.

3. The combination of the lower berth having a governing-weight attached to and suspended directly beneath it, and provided at the sides with suitable pivots or trunnions with the frame-work in which the trunnions seat and turn, the said frame-work being suspended from and pivoted to the bulk-heads of the state-room, and horizontal anti friction rollers interposed between the ends of the swinging frame and the bulk-heads, all being arranged substantially as shown, and for the purposes set forth.

4. The combination of the lower berth provided with a governing-weight attached to and suspended directly beneath it, the trunnions secured to the berth-box midway at its sides, with a yoke-shaped frame in which the trunnions seat and turn, the longitudinal bars for supporting the frames, and the V-shaped suspenders hung from the bulk-heads of the stateroom, as set forth and described.

5. The combination of the lower berth provided with a governing-weight attached directly to it, the trunnions secured to the outsides of the berth-box, and the braces or stays N, extending from the aforesaid trunnions to the attaching-rods of the governing-weight, for giving additional strength to the parts, as shown and described.

6. The combination of the lower berth provided with a governing-weight and trunnions, the frame-work in which the trunnions are seated and which is suspended from the bulkheads, the hollow castings K, secured to said frame-work, the anti-friction rollers journaled in said castings, and the tracks upon which said rollers travel, substantially as and for the purpose set forth.

7. The combination, with the upper berth provided with centrally-located trunnions projecting from its sides, of an arm extending across the berth and provided with suitable bearings in which said trunnions seat and turn, a longitudinal shaft to which said arm is secured, the bulk-heads, trunnions journaled therein and supporting said longitudinal shaft, the lower self-leveling berth and connections between the two berths, whereby the lower berth will control the movements of the upper, substantially as set forth.

8. The combination of an upper berth suspended from the bulk-heads of the state-room, and a lower berth, likewise suspended and provided with a governing-weight, as described, the upper berth being connected to the lower berth by means of vertical rods having knuckle or ball-and-socket joints, and connecting the respective corners of the berth-boxes.

9. The combination, with an upper berth provided with centrally-located trunnions at its sides, an arm or frame extending beneath said berth and provided at its ends with suitable bearings in which the aforesaid trunnions seat and turn, of a longitudinal shaft arranged in the rear of the berth-box, and transverse arms secured to the ends of said shaft and suspended from the bulk-heads of the state-room.

10. The combination of the upper berth having centrally-located trunnions at its sides, with the frame extending beneath the berth to afford bearings to the trunnions, the longitudinal shaft arranged in the rear of the berth, the transverse arms pivoted to the bulk-heads, the anti-friction rollers arranged upon the shaft, and the bearing-surfaces on which said rollers travel arranged upon the bulk-heads, as set forth and shown.

11. The combination, with a pair of berths secured together at their respective corners by universal connections and having centrally-located trunnions projecting from their sides, of a pair of frames in which said trunnions are journaled, the bulk-heads, trunnions journaled therein and supporting said frame, tracks concentric with said trunnions secured to said bulk-heads, and horizontal rollers interposed between said frames and tracks, substantially in the manner and for the purpose set forth.

12. The combination of the berth, the wire-gauze frame or guard, arranged as described, and the centrally-located seat.

13. The combination, with a berth-box having transverse supporting-trunnions and a counterpoise-weight suspended beneath it for maintaining it in horizontal position, of a second or supplemental weight adjustable lengthwise the berth, substantially as and for the purposes set forth.

14. The combination, with the berth supported upon trunnions projecting in a direction parallel therewith and a governing-weight depending from the under side thereof, of the outer guard, C, located at the side of the berth, and having the cut-away portion C', and the steps D, opposite said cut-away portion, for the purposes set forth.

15. The combination, with a swinging berth and a governing-weight depending therefrom, of a seat secured to the side of the berth near the center of its longitudinal motion, the outer guard, C, located at the side of the berth, the step D, and the supplemental flexible guard D', connected at its respective ends with said seat and step, for the purposes set forth.

JEROME B. SECOR.

Witnesses:
HERBERT KNIGHT,
WM. H. CAPEL.